(12) United States Patent
McCobb et al.

(10) Patent No.: US 10,553,198 B1
(45) Date of Patent: *Feb. 4, 2020

(54) VOICE-ACTIVATED CUSTOMER SERVICE ASSISTANT

(71) Applicant: West Corporation, Omaha, NE (US)

(72) Inventors: Gerald M. McCobb, Delray Beach, FL (US); David Stirk, Redfern (AU)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,131

(22) Filed: Sep. 5, 2017

Related U.S. Application Data

(63) Continuation of application No. 15/057,854, filed on Mar. 1, 2016, now Pat. No. 9,754,579, which is a continuation of application No. 14/219,175, filed on Mar. 19, 2014, now Pat. No. 9,275,632.

(51) Int. Cl.
   *G06Q 30/00* (2012.01)
   *G10L 17/22* (2013.01)
   *G10L 13/027* (2013.01)

(52) U.S. Cl.
   CPC .......... *G10L 13/027* (2013.01); *G06Q 30/016* (2013.01); *G10L 17/22* (2013.01)

(58) Field of Classification Search
   CPC ............. H04M 2201/40; H04M 7/006; H04M 15/745; H04M 2215/0108; H04M 3/4938; H04M 3/533; H04M 2201/39; H04M 3/42059; H04M 2201/42; G10L 15/26; G10L 17/00; G10L 15/20; G10L 15/30; G10L 13/00; G06F 3/16

USPC .... 704/257–258, 275, 270.1, 246, 270, 261, 704/231, E15.045, E15.039; 379/88.01, 379/88.22, 88.02

See application file for complete search history.

(56) References Cited

U.S. PATENT DOCUMENTS

| | | | |
|---|---|---|---|
| 6,181,780 B1* | 1/2001 | Finnigan | H04M 3/533 379/67.1 |
| 6,731,725 B1* | 5/2004 | Merwin | H04M 1/274575 379/80 |
| 7,593,520 B1* | 9/2009 | Croak | H04M 3/385 379/202.01 |
| 9,183,834 B2* | 11/2015 | Gatzke | G10L 15/06 |
| 10,127,908 B1* | 11/2018 | Deller | G10L 15/22 |
| 10,199,051 B2* | 2/2019 | Binder | G06F 3/167 |
| 2002/0069060 A1* | 6/2002 | Cannavo | H04M 3/53333 704/257 |
| 2002/0077082 A1* | 6/2002 | Cruickshank | H04L 51/066 455/413 |
| 2006/0182232 A1* | 8/2006 | Kerr | H04M 3/53333 379/67.1 |

* cited by examiner

*Primary Examiner* — Dwayne D Bost
*Assistant Examiner* — Stephen M Brinich

(57) ABSTRACT

A method, apparatus and non-transitory computer readable storage medium, in one embodiment, interpreting at least one input from a user via a wireless device, receiving at least one user account with the at least one input, deriving at least one representation of user intent, identifying at least one task based on the at least one representation of user intent, contacting at least one service to perform the identified at least one task and synthesizing speech to communicate a result of the contact to the wireless device.

12 Claims, 6 Drawing Sheets

VOICE-ACTIVATED CUSTOMER SERVICE ASSISTANT

CROSS-REFERENCE TO RELATED APPLICATIONS

This application is a continuation from U.S. patent application Ser. No. 15/057,854, filed Mar. 1, 2016, entitled "VOICE-ACTIVATED CUSTOMER SERVICE ASSISTANT", which is a continuation from U.S. patent application Ser. No. 14/219,175, filed Mar. 19, 2014, entitled "VOICE-ACTIVATED CUSTOMER SERVICE ASSISTANT", now issued U.S. Pat. No. 9,275,632, the entire contents of each of which are included herein in their entirety by this reference.

FIELD

The present disclosure generally involves mobile virtual assistants and more specifically voice activated customer service assistants that interact with customer data centers on behalf of a user.

BACKGROUND

Conventionally, voice-activated assistants may perform tasks such as download weather forecasts and show local show times for a movie or concert. These assistants typically rely on Internet search and localization technologies and access to calendar, e-mail, and other applications on a mobile device and on the Internet. An assistant may add an appointment to a personal calendar, but typically may not make an appointment with a personal service such as a doctor, lawyer, technician and the like. The tasks the voice-activated assistants may perform are typically constrained to the applications available on the mobile device and publicly available Internet applications. Current voice activated assistants currently do not interact with the user's personal customer services like his/her doctor, auto mechanic, bank, ticket agent and the like.

SUMMARY

In one embodiment, a method comprises at least one of: interpreting at least one input from a user via a wireless device, receiving at least one user account with the at least one input, deriving at least one representation of user intent, identifying at least one task based on the at least one representation of user intent, contacting at least one service to perform the identified at least one task and synthesizing speech to communicate a result of the contact to the wireless device.

In another embodiment, an apparatus comprises at least one of: a processor configured to interpret at least one input from a user via a wireless device, receiving at least one user account with the at least one input, derive at least one representation of user intent, identify at least one task based on the at least one representation of user intent, contact at least one service to perform the identified at least one task and synthesize speech to communicate a result of the contact to the wireless device.

In a further embodiment, a non-transitory computer readable storage medium configured to store instructions that when executed causes a processor to perform at least one of: interpreting at least one input from a user via a wireless device, receiving at least one user account with the at least one input, deriving at least one representation of user intent, identifying at least one task based on the at least one representation of user intent, contacting at least one service to perform the identified at least one task and synthesizing speech to communicate a result of the contact to the wireless device.

DETAILED DESCRIPTION

Figure 1:
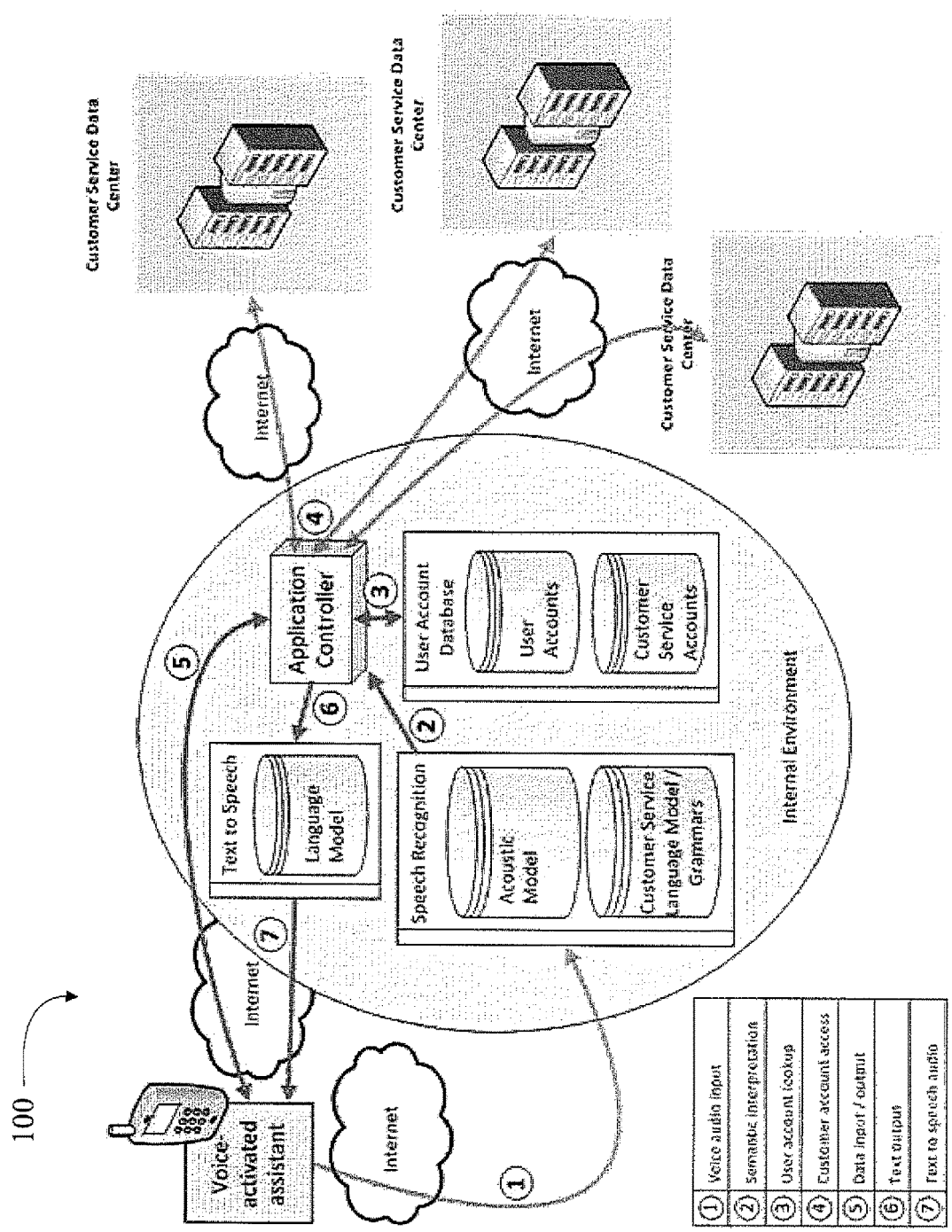
FIG. 1 illustrates an example architectural view, in accordance with one embodiment of the disclosure.

It may be readily understood that the components of the present application, as generally described and illustrated in the figures herein, may be arranged and designed in a wide variety of different configurations. Thus, the following detailed description of the examples of a method, apparatus, and system, as represented in the attached figures, is not intended to limit the scope of the application as claimed, but is merely representative of selected examples of the application.

The features, structures, or characteristics of the application described throughout this specification may be combined in a suitable manner in one or more examples. For example, the usage of the phrases example, examples, some examples, or other similar language, throughout this specification refers to the fact that a particular feature, structure, or characteristic described in connection with the example may be included in at least one example of the present application. Thus, appearances of the phrases example, examples, in some examples, in other examples, or other similar language, throughout this specification do not necessarily refer to the same group of examples, and the described features, structures, or characteristics may be combined in a suitable manner in one or more examples.

The disclosure discusses an application resident on a wireless user device. The device may be a computer, laptop, mobile, wireless or cellular phone, a PDA, a tablet, a client, a server or a device that contains a processor and/or memory, whether that processor or memory performs a function related to an example. The present application discussed throughout the disclosure may work with a device, such as a personal computer with a touch screen, a laptop with a touch screen, a personal computing tablet, a smartphone or a device with a processor, memory and a touch screen.

The current disclosure allows interaction between a wireless user device and a customer service data center.

At the time of user registration, speaker verification setup may have the user announce at least one phrase that may be compiled into a voice print file or the like. This voice print file may subsequently be utilized for comparison to verify the identity of the user.

At the time of business registration, the business may provide access to its appointment calendar or the like, through the Internet. This allows registered businesses to schedule business with registered users without the need for human intervention.

Utilizing the voiceprint of the registered user, the system may search for a registered business that matches a particular sought after service, such as Acme Car Repair, wherein the system may access that businesses appointment calendar for scheduling.

One method by which a voice assistant may be used to register a user for a business is to inform the user that the service is available to associate the account to the user. The user therefore does not need to register with the voice assistant system beforehand. The registered business may access the assistant system and provide the assistant system with the account information. The voice assistant system may then perform verification by sending the user a welcome e-mail for every service added to the user's account.

An example of the disclosure is comprised of the following: the application runs on a mobile device with a speech and visual input and output user interface. The application posts or streams recorded audio, renders synthesized speech, displays visual data, and sends visual input to the internal application environment. The user is registered securely with the mobile application and the internal application environment.

The internal application environment comprises at least one of the following, the speech recognition engine having an acoustic model, language model and grammars optimized for recognizing customer service requests and the Text-to-Speech (TTS) engine for synthesizing the audio rendered by the mobile device.

The application controller may access repositories of user accounts, customer service accounts associated with the user, and dynamic web service APIs associated with the customer service account.

The application controller listens for semantic interpretations from the speech recognition engine and data requests and updates submitted from the mobile application. A rules-based search searches for the customer service account that best matches the interpretation and one or more data centers associated with a customer account registered with the user and accessible by a web service API or data connection. When the Application Controller matches the customer service to the users request it also searches the web service Application Programming Interface (API) to contact the data center. The data center may have APIs for getting available dates and times for an appointment, setting an appointment, requesting a notification, and getting, paying a bill balance and the like. The application, as referenced to in the current disclosure, resides on or in the user's mobile wireless device.

An example of the disclosure comprises a mobile virtual assistant application and system that interacts with the user's personal customer services to perform tasks like making an appointment and paying a bill. The application includes speech recognition and synthesis and a visual user interface. The system includes an application controller with access to the user's customer account information and a data connection to the customer account data center.

An example of the disclosure is comprised of the following, the application runs on a mobile device with a speech and visual input and output user interface. The application posts or streams recorded audio, renders synthesized speech, displays visual data and sends visual input to the internal application environment. The user is registered securely with the mobile application and the internal application environment.

The internal application environment is comprised of the following, the speech recognition engine with an acoustic model, language model and grammars optimized for recognizing customer service requests. The Text-to-Speech (TTS) engine for synthesizing the audio rendered may be resident in the mobile device.

The application controller may have access to repositories of user accounts, customer service accounts associated with the user and dynamic web service APIs associated with the customer service account. The Application Controller listens for semantic interpretations from the speech recognition engine and data requests and updates submitted from the mobile application. A rules-based search locates the customer service account that best matches the interpretation.

One or more data centers may be associated with a customer account registered with the user and accessible by a web service API or data connection. When the application controller matches the customer service to the users request it also locates the web service API to contact the data center. The data center may have APIs for getting available dates and times for an appointment, setting an appointment, requesting a notification, and getting and paying a bill balance and the like.

FIG. 1 depicts, in one example an architectural view 100 in accordance with one embodiment of the disclosure. In this example a wireless device receives a voice audio input 1 that undergoes speech recognition by semantic interpretation 2 by an acoustic model and/or service language model and grammars. The user account is looked-up 3 in at least one user account database such as a user account and/or a customer service accounts and the like. A customer account is accessed 4 by the application controller which inputs and outputs data 5 from the application controller to and from the wireless device and customer service data center. The application controller also outputs text 6 to the text to speech module which outputs text to speech audio 7.

Figure 2:
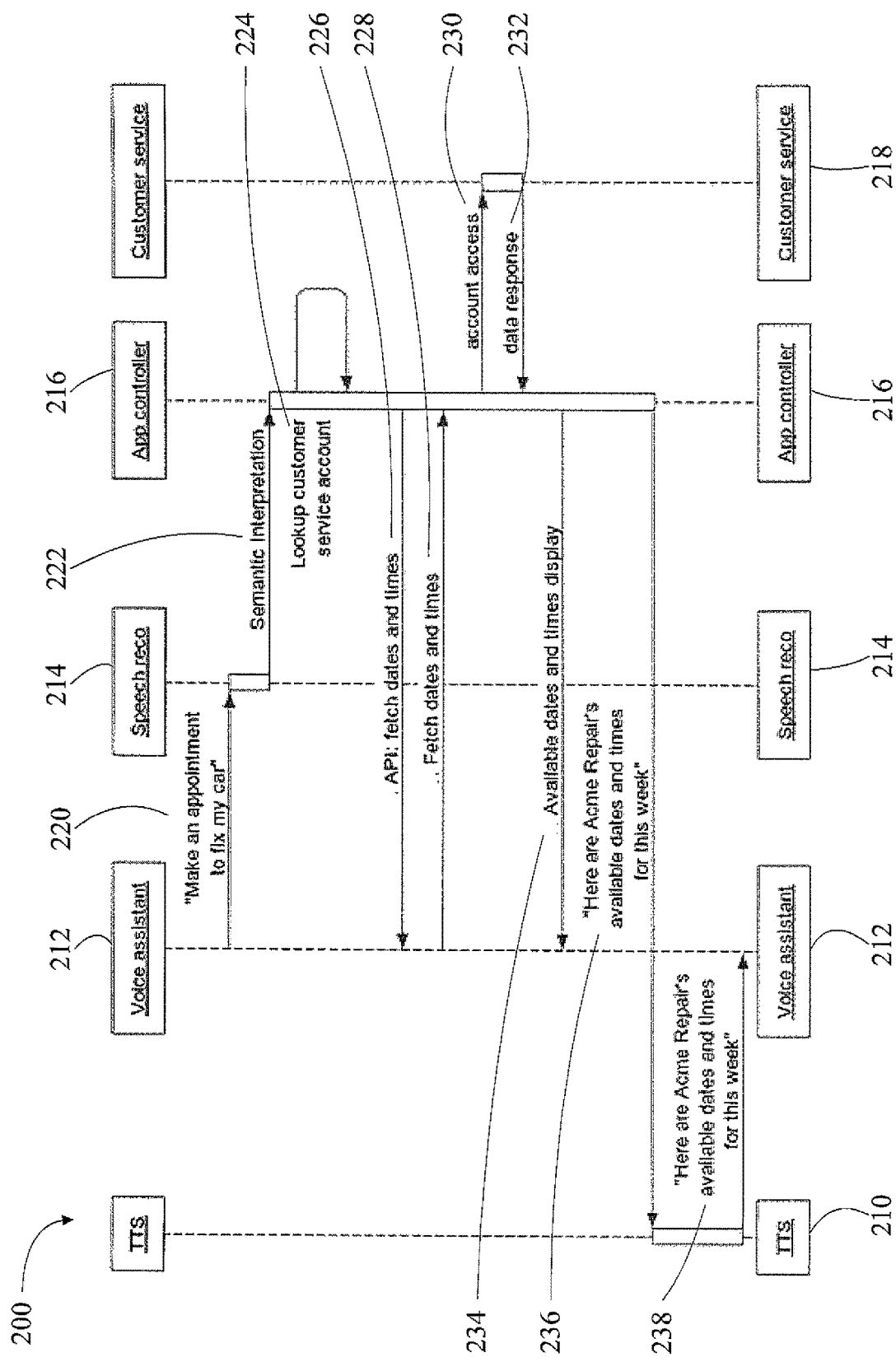
FIG. 2 illustrates an example activity diagram, in accordance with one embodiment of the disclosure.

FIG. 2 depicts, in another example an activity diagram 200, showing the step by step workflow of the application and system when the user inputs "make an appointment to fix my car" into the application. The example is comprised of at least a text to speech module 210, a voice assistant module 212, a speech recognition module 214, an application controller 216 and a customer service 218. The voice input "make an appointment to fix my car" 220 is input into the voice assistant 212 and is received by the speech recognition module 214. A semantic interpretation 222 of the request is performed by the application controller 216. The application controller looks up the customer service account 224. The application programming interface fetches 226 the dates and times available for the appointment and sends those to the application controller 228. A customer service account is accessed 230 and a data response is received 232 by the application controller. The available dates and times are sent 234 in audio and visual form the voice assistant. The application controller may state 236 "here are Acme Repairs available dates and times for this week. A user input response may be sent from the voice assistant module to the speech recognition module accepting one of the available dates and times.

Figure 3:
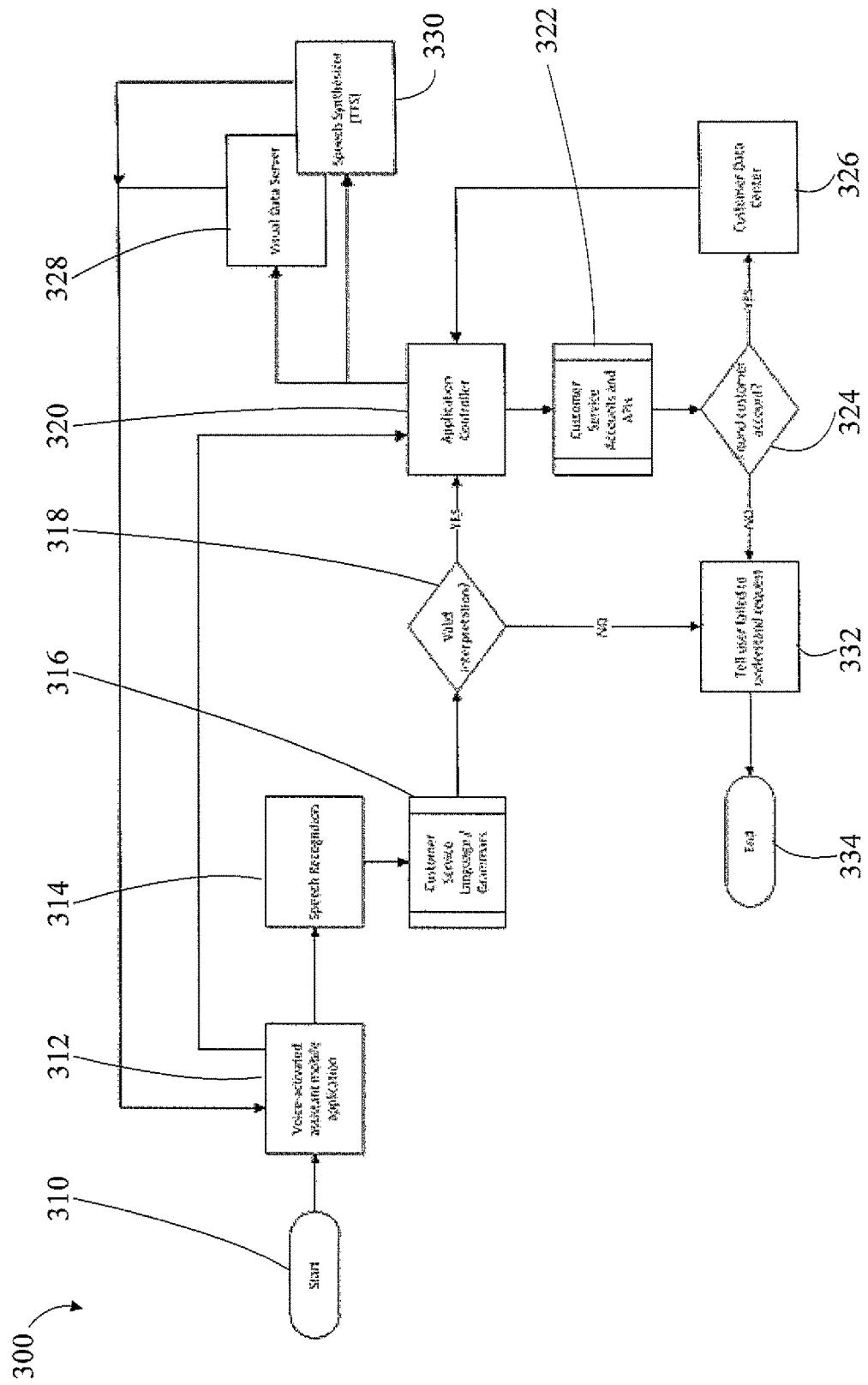
FIG. 3 illustrates an example flow chart, in accordance with one embodiment of the disclosure.

FIG. 3 depicts, in a further example a flow chart 300 showing the sequence of actions within the system when the user inputs a request into the application. The method starts 310 with a voice speaking into wireless device. The voice activated assistant mobile application 312 receives the spoken voice that activates a speech recognition module 314 that accesses 316 customer service language and grammars. A determination is made as to whether a valid interpretation is made 318 and if affirmative, the application controller 320 is accessed, as are the customer service accounts and application programming interfaces 322. If a customer service account is found 324, a customer data center 326 is accessed which interfaces with the application controller. A visual data server 328 and a speech synthesizer 330 communicate with the voice activated assistant mobile application. If a valid interpretation is not found or if the customer account is not found, the user is informed 332 that the request was not understood and the application at 334 is ready for user input after asking either for clarification or how else it can help.

If the application resides on a wireless device, the application may be downloaded through a platform (such as an application store or market) residing on the device or accessed via the device. The data stored for this disclosure may also be in the cloud.

The current application may work with a device such as a personal computer with a touch screen, a laptop with a touch screen, a personal computing tablet, a smartphone or a device with a processor, memory and a screen including a touch screen.

Figure 4:
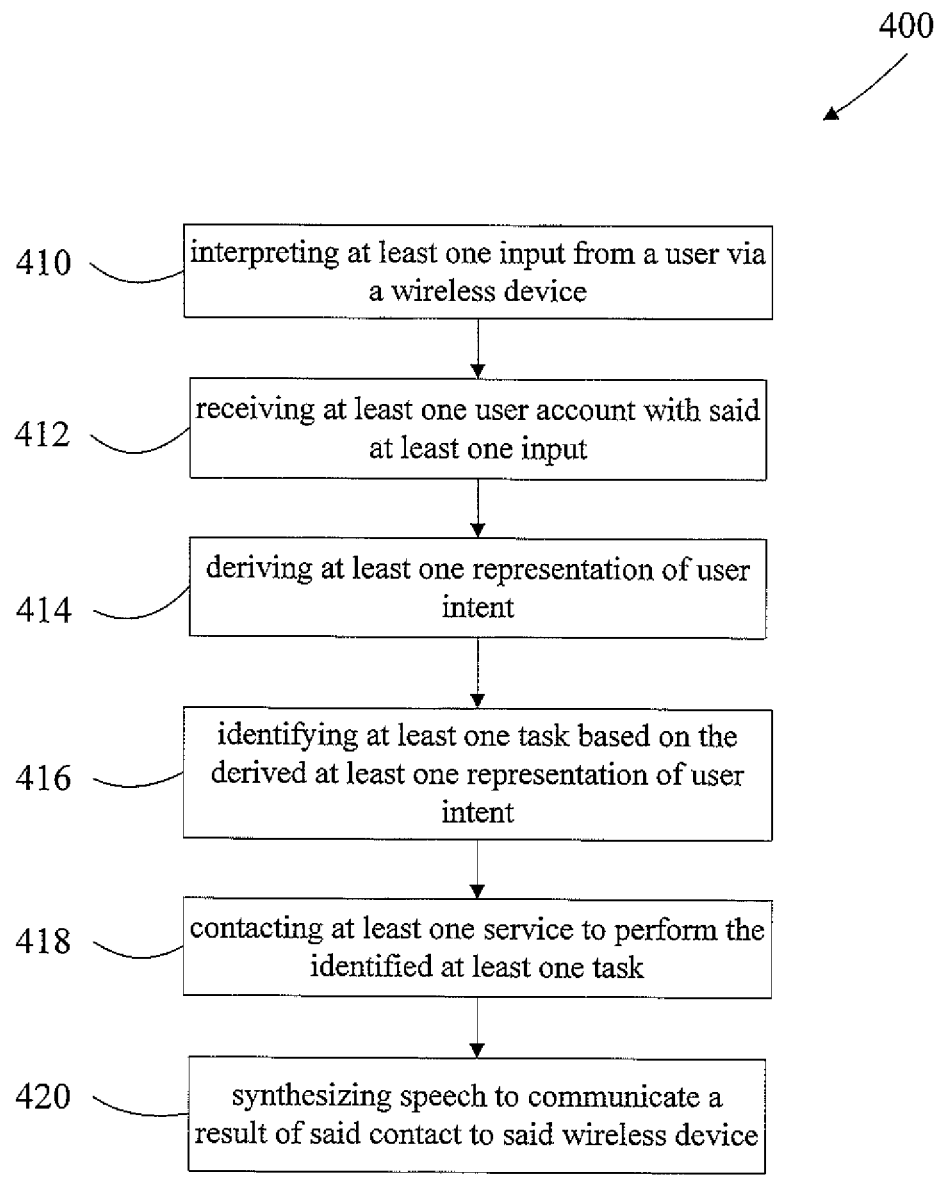
FIG. 4 illustrates a first example of voice activated customer service assistant method, in accordance with one embodiment of the disclosure.

FIG. 4 shows and describes a method 400, comprising, interpreting 410 at least one input from a user via a wireless device, receiving 412 at least one user account with said at least one input, deriving 414 at least one representation of user intent, identifying 416 at least one task based on the derived at least one representation of user intent, contacting 418 at least one service to perform the identified at least one task and synthesizing 420 speech to communicate a result of the contact to the wireless device.

The computer implemented method of FIG. 4 may additionally comprise authorizing at least one user account, authorizing the at least one customer service account, texting to communicate the result of the contact to the wireless device and inputting a response based on the communicated result. The method interpreting at least one input is based on at least one text input and or at least one input is based on at least one speech input, wherein contacting at least one service is to a customer service data center and result of the contact to the wireless device is a set of alternatives. An additional way to identify the user account is voice biometrics, speaker recognition and the like. Using speaker recognition, the system will be available for use with Plain Old Telephone Service (POTS) service. The user account may be identified through the speaker's unique natural voice patterns. The voice patterns detected in the user input may be compared with a voice print file stored in the system database. In one envisioned VoIP solution, the user account may be identified, in one embodiment, by a header packet sequence placed at the start of the users recorded input data streamed to the system. Additionally, a system web service API call may be performed that includes the account unique identifier that is made before the recorded input is sent to the system.

Figure 5:
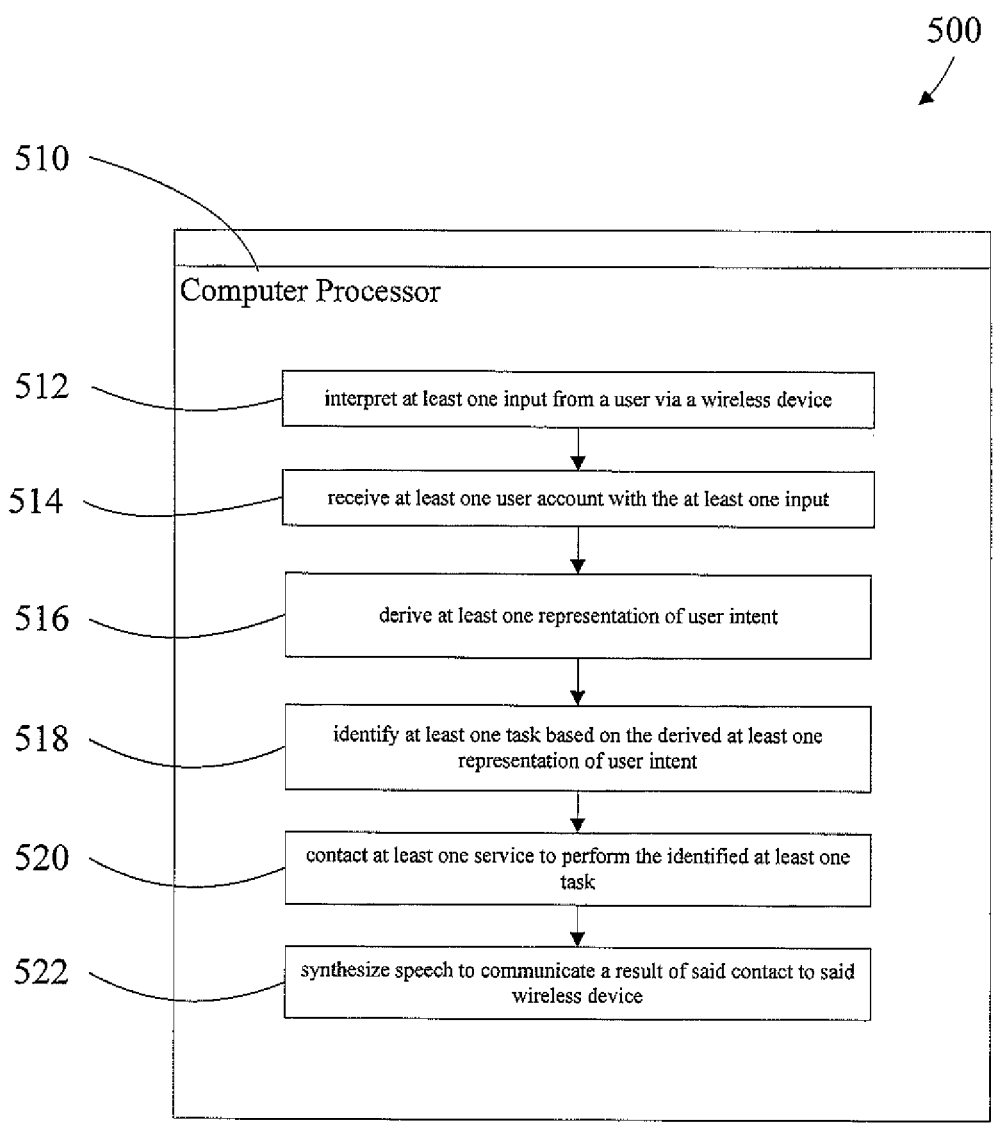
FIG. 5 illustrates a second example of voice activated customer service assistant system, in accordance with one embodiment of the disclosure.

FIG. 5 shows and describes an apparatus 700, comprising a processor 510 configured to interpret 512 at least one input from a user via a wireless device, receive 514 at least on user account with the at least one input, derive 516 at least one representation of user intent, identify 518 at least one task based on the derived at least one representation of user intent, contact 520 at least one service to perform the identified at least one task and synthesize 522 speech to communicate a result of the contact to the wireless device.

The apparatus of FIG. 5 may also configure the processor to authorize at least one user account, authorize the at least one customer service account, text to communicate the result of the contact to the wireless device and input a response based on the communicated result.

Figure 6:
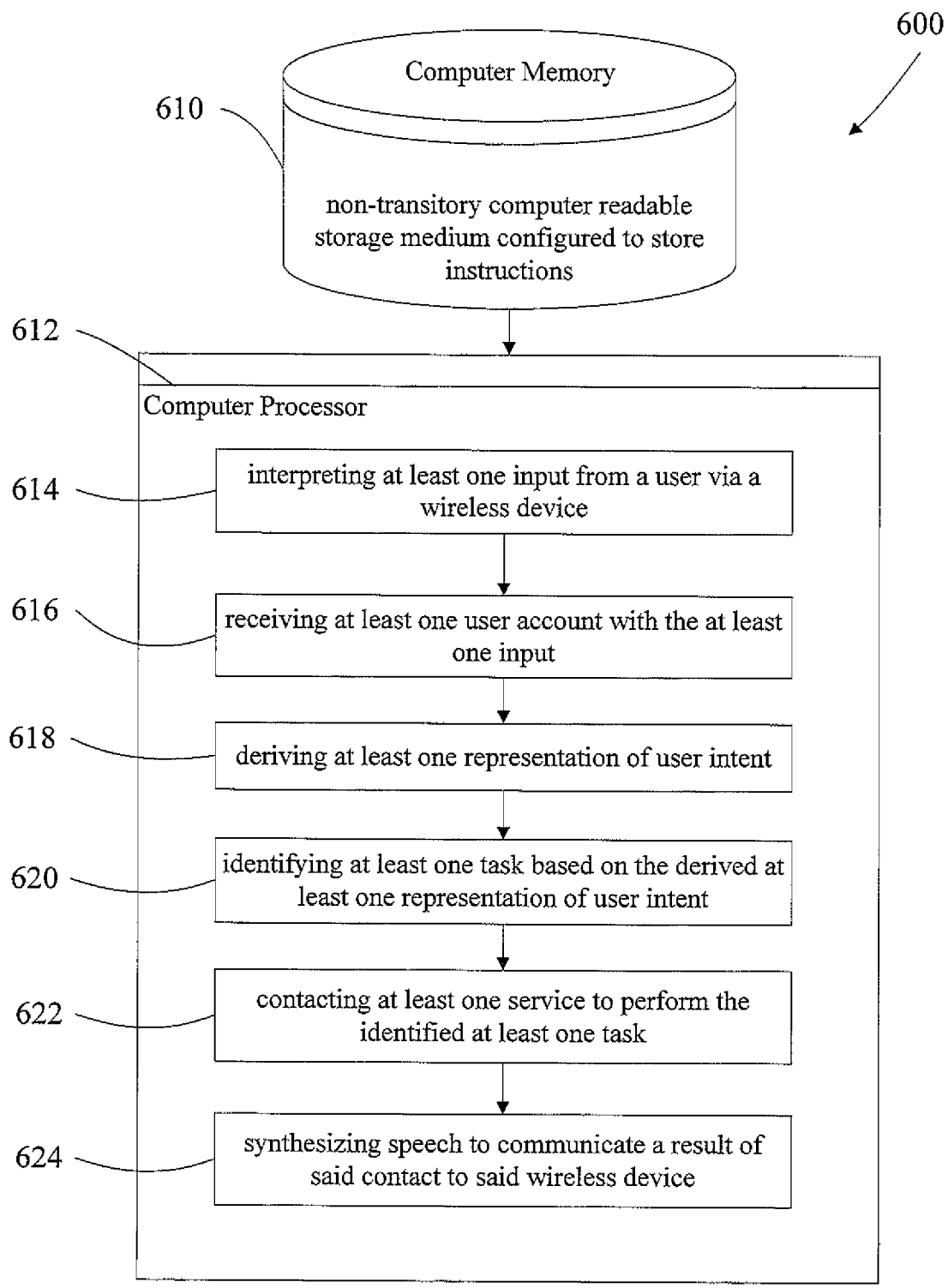
FIG. 6 illustrates a third example of voice activated customer service assistant computer readable medium, in accordance with one embodiment of the disclosure.

FIG. 6 shows and describes a non-transitory computer readable storage medium 610 configured to store instructions that when executed causes a processor 612 to perform interpreting 614 at least one input from a user via a wireless device, receiving 616 at least one user account with the at least on input, deriving 618 at least one representation of user intent, identifying 620 at least one task based on the derived at least one representation of user intent, contacting 622 at least one service to perform the identified at least one task and synthesizing 624 speech to communicate a result of the contact to the wireless device.

FIG. 6 may also comprise interpreting at least one input is based on at least one text input and or at least one speech input and contacting at least one service is to a customer service data center.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit (ASIC). In the alternative, the processor and the storage medium may reside as discrete components, for example a network element, which may represent network components.

Although an exemplary example of the system, method, and computer readable medium of the present disclosure has been illustrated in the accompanied drawings and described in the foregoing detailed description, it may be understood that the disclosure is not limited to the examples disclosed, and is capable of numerous rearrangements, modifications, and substitutions without departing from the spirit or scope of the disclosure as set forth and defined by the following claims. For example, the capabilities of the systems may be performed by one or more of the modules or components described herein or in a distributed architecture. For example, the functionality performed by the individual modules, may be performed by one or more of these modules. Further, the functionality described herein may be performed at various times and in relation to various events, internal or external to the modules or components. Also, the information sent between various modules may be sent between the modules via at least one of: a data network, the Internet, a voice network, an Internet Protocol network, a wireless device, a wired device and/or via plurality of protocols. Also, the messages sent or received by module and may be sent or received directly and/or via one or more of the other modules.

While preferred examples of the present application have been described, it is to be understood that the examples described are illustrative only and the scope of the application is to be defined solely by the appended claims when considered with a full range of equivalents and modifications (e.g., protocols, hardware devices, software platforms etc.) thereto.

What is claimed is:

1. A method of accessing a service center associated with a user account, the method comprising:
receiving, via an application controller, at least one input from a user associated with the user account via a wireless device;
identifying, via the application controller, the user account as associated with the user based on an analysis of the at least one input;
identifying, via the application controller, a task associated with the user and the service center based on the analysis of the at least one input;
requesting, via the application controller, performance of the task by the service center;
receiving, via the application controller, a response from the service center;
processing, via the application controller, the response from the service center to identify calendar information associated with the response;
generating, via the application controller, both a speech response and a visual response based on the response from the service center and the calendar information; and
communicating, via the application controller, the speech response and the visual response to the wireless device.

2. The method of claim 1, further comprising:
accessing, via the application controller, the user account based on the at least one input.

3. The method of claim 2, further comprising:
authorizing the user account.

4. The method of claim 1, further comprising:
receiving, via the application controller, a response to the speech response and the visual response from the wireless device.

5. The method of claim 1, wherein the receiving the at least one input from a user further comprises:
receiving a verbal input; and
identifying a meaning of the verbal input via sematic interpretation.

6. An apparatus for accessing a service center associated with a user account, the apparatus comprising:
a processor configured to:
receive at least one input from a user associated with the user account via a wireless device;
identify the user account as associated with the user based on an analysis of the at least one input;
identifying a task associated with the user and the service center based on the analysis of the at least one input;
request performance of the task by the service center;
receiving, via the application controller, a response from the service center;
process the response from the service center to identify calendar information associated with the response;
generate both a speech response and a visual response based on the response from the service center and the calendar information; and
communicate the speech response and the visual response to the wireless device.

7. The apparatus of claim 6, wherein the processor is further configured to:
access the user account based on with at least one input.

8. The apparatus of claim 7, wherein the processor is further configured to:
authorize the user account.

9. The apparatus of claim 6, wherein the processor is further configured to:
receive a response to the speech response and the visual response from the wireless device.

10. The apparatus of claim 6, wherein, when the processor is configured to receive a response to the speech response and the visual response from the wireless device, the processor is further configured to:
receive a verbal input; and
identify a meaning of the verbal input via sematic interpretation.

11. A non-transitory computer readable storage medium configured to store instructions that cause a processor to access a service center associated with a user account, the instructions causing the processor to perform:
receiving, via an application controller, at least one input from a user associated with the user account via a wireless device;
identifying, via the application controller, the user account as associated with the user based on an analysis of the at least one input;
identifying, via the application controller, a task associated with the user and the service center based on the analysis of the at least one input;
requesting, via the application controller, performance of the task by the service center;
receiving, via the application controller, a response from the service center;
processing, via the application controller, the response from the service center to identify calendar information associated with the response;
generate, via the application controller, both a speech response and a visual response based on the response from the service center and the calendar information; and
communicating, via the application controller, the speech response and the visual response to the wireless device.

12. The non-transitory computer readable storage medium of claim 11, further configured to store instructions that when executed causes the processor to:
receiving a verbal input; and
identifying a meaning of the verbal input via sematic interpretation.

* * * * *